United States Patent
Kato et al.

(10) Patent No.: US 8,032,998 B2
(45) Date of Patent: Oct. 11, 2011

(54) MANUFACTURING APPARATUS FOR A FOIL BEARING

(75) Inventors: Daisuke Kato, Wako (JP); Yoshiki Morishita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 849 days.

(21) Appl. No.: 12/071,121

(22) Filed: Feb. 15, 2008

(65) Prior Publication Data

US 2008/0205803 A1    Aug. 28, 2008

(30) Foreign Application Priority Data

Feb. 22, 2007 (JP) .................................. 2007-041557

(51) Int. Cl.
*B23P 19/04* (2006.01)
*B25B 27/14* (2006.01)
(52) U.S. Cl. .............. 29/255; 29/281.1; 269/53; 269/71
(58) Field of Classification Search ..................... 29/724, 29/525.14, 898, 281.1; 384/103–106
See application file for complete search history.

(56) References Cited

U.S. PATENT DOCUMENTS

| | | | | |
|---|---|---|---|---|
| 3,958,739 | A * | 5/1976 | Wicker et al. | 222/541.5 |
| 4,465,384 | A * | 8/1984 | Heshmat et al. | 384/106 |
| 5,427,455 | A * | 6/1995 | Bosley | 384/106 |
| 5,444,206 | A * | 8/1995 | Isshiki et al. | 219/121.63 |
| 6,158,893 | A * | 12/2000 | Heshmat | 384/106 |
| 6,450,688 | B2 * | 9/2002 | Matsushima | 384/103 |
| 7,070,330 | B2 | 7/2006 | Agrawal | |
| 2007/0058890 | A1 * | 3/2007 | Al-Bender | 384/104 |

* cited by examiner

*Primary Examiner* — Derris H Banks
*Assistant Examiner* — Kaying Kue
(74) *Attorney, Agent, or Firm* — Squire, Sanders & Dempsey (US) LLP

(57) ABSTRACT

A manufacturing apparatus for a foil bearing comprises: a tubular positioning member having a substantially cylindrical wall provided with engagement portions each having a shape corresponding to at least part of a wave-shaped portion of associated one of foil members such that positioning of the foil members can be achieved by engaging the wave-shaped portion of each foil member to the associated engagement portion of the positioning member and inserting the positioning member into an inside of the stationary mount member; and a welding device for welding the foil members to the inner circumferential surface of the stationary mount member, wherein the positioning member is formed with openings in the substantially circumferential wall thereof to allow the welding device to access the foil members from inside the positioning member through the openings.

4 Claims, 6 Drawing Sheets

MANUFACTURING APPARATUS FOR A FOIL BEARING

TECHNICAL FIELD

The present invention relates to a manufacturing apparatus for a foil bearing comprising a stationary mount member surrounding a journal of a rotating member via an annular gap and a foil assembly disposed in the gap to support the journal.

BACKGROUND OF THE INVENTION

It is conventionally known to use a foil bearing as a bearing for a rotating member that rotates at a high speed from tens to hundreds of thousands rpm, in which the foil bearing comprises a plurality of foils for forming a bearing surface. As the rotating member rotates, a fluid is dragged in between a journal (or shaft) of the rotating member and the foils, and due to the resulting fluid pressure, the foils are deformed and a fluid membrane is formed in the gap between the journal and the foils.

Some of such foil bearings comprise a stationary mount member surrounding an outer circumferential surface of the journal via an annular gap and a foil assembly disposed inside the stationary mount member to support the journal, wherein the foil assembly may be constituted by wave-shaped bump foils, an annular mid foil, and an annular top foil which are radially placed in this order from outside to inside within the stationary mount member. In order to achieve a desired bearing performance, it is necessary to position and secure each foil accurately with respect to the stationary mount member.

An example of a technique to secure the foils to the stationary mount member is disclosed in U.S. Pat. No. 7,070,330 issued to Agrawal. The foil bearing disclosed in this publication comprises first and second foil elements (top foil and mid foil) whose ends are bonded to each other to form a radially extending anti-rotation fin, and a corrugated resilient backing member (bump foil) including a flange portion projecting in the radial direction, wherein the anti-rotation fin and the flange portion are disposed in a slot formed in the stationary retaining (mount) member.

In the conventional technique disclosed in the above publication, the disposing of the anti-rotation fin and flange portion in the slot may restrain the foils against rotation. However, there is no consideration given in this publication to ensure accurate positioning of each corrugation of the resilient backing member in a circumferential direction. Also, the provision of slot in the stationary mount member can necessitate additional steps in manufacturing the stationary mount member and/or reduce the mechanical strength of the stationary mount member.

Further, in a case that the foil bearing comprises a plurality of bump foils arranged in the circumferential direction and welded to the inner circumferential surface of the stationary mount member, it is difficult to utilize the conventional technique disclosed in the above publication and a skilled person is needed to position the bump foils accurately with respect to the stationary mount member or at desired circumferential positions and secure them to the stationary mount member.

BRIEF SUMMARY OF THE INVENTION

The present invention is made to solve the above problems in the prior art and a primary object of the invention is to provide a manufacturing apparatus for a foil bearing that can allow a plurality of foil members to be positioned accurately in a circumferential direction and welded to an inner circumferential surface of a stationary mount member surrounding an outer circumferential surface of a journal via an annular gap.

According to the present invention, such an object can be achieved by providing a manufacturing apparatus for a foil bearing having a stationary mount member surrounding an outer circumferential surface of a journal via an annular gap and a plurality of foil members each having a wave-shaped portion, the foil members being circumferentially arranged on an inner circumferential surface of the stationary mount member, the apparatus comprising: a tubular positioning member having a substantially cylindrical wall provided on its outer circumferential surface with engagement portions each having a shape corresponding to at least part of the wave-shaped portion of associated one of the foil members such that positioning of the foil members can be achieved by engaging the wave-shaped portion of each foil member to the associated engagement portion of the positioning member and inserting the positioning member into an inside of the stationary mount member; and a welding device for welding the foil members to the inner circumferential surface of the stationary mount member, wherein the positioning member is formed with openings in the substantially circumferential wall thereof to allow the welding device to access the foil members from inside the positioning member through the openings.

According to such a structure, the foil members can be accurately positioned at desired circumferential positions quite easily simply by engaging them with associated engagement portions provided on the outer circumferential surface of the tubular positioning member. Also, because the welding device of the manufacturing apparatus can access the foil members attached to the positioning member from inside the positioning member through the openings formed in the cylindrical wall of the positioning member, the welding of the foil members to the inner circumferential surface of the stationary mount member can be achieved easily.

Preferably, the manufacturing apparatus comprises a base for supporting the stationary mount member, wherein the base is provided with a movement mechanism for allowing movement of the stationary mount member in an axial direction. In this way, it is possible to move the stationary mount member together with the inserted positioning member and the foil members in the axial direction, and this allows the welded position of each foil member to be changed in the axial direction without axially moving the welding device. Therefore, more accurate welding can be achieved reliably.

Also preferably, the manufacturing apparatus comprises a base for supporting the stationary mount member, wherein the base is provided with a rotation mechanism for allowing rotation of the stationary mount member around its axis. This makes it possible to select the member (any of the foil members) to be welded as well as to change the welded position of each foil member in the circumferential direction without rotating a head portion (or electrode) of the welding device. Therefore, more accurate welding can be achieved reliably.

According to a preferred embodiment, the openings formed in the substantially cylindrical wall of the positioning member each consist of a slot extending in the axial direction so as to expose only a welded part of associated one of the foil members. This can effectively prevent an undesired part of the foil members to be welded inadvertently to the stationary mount member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
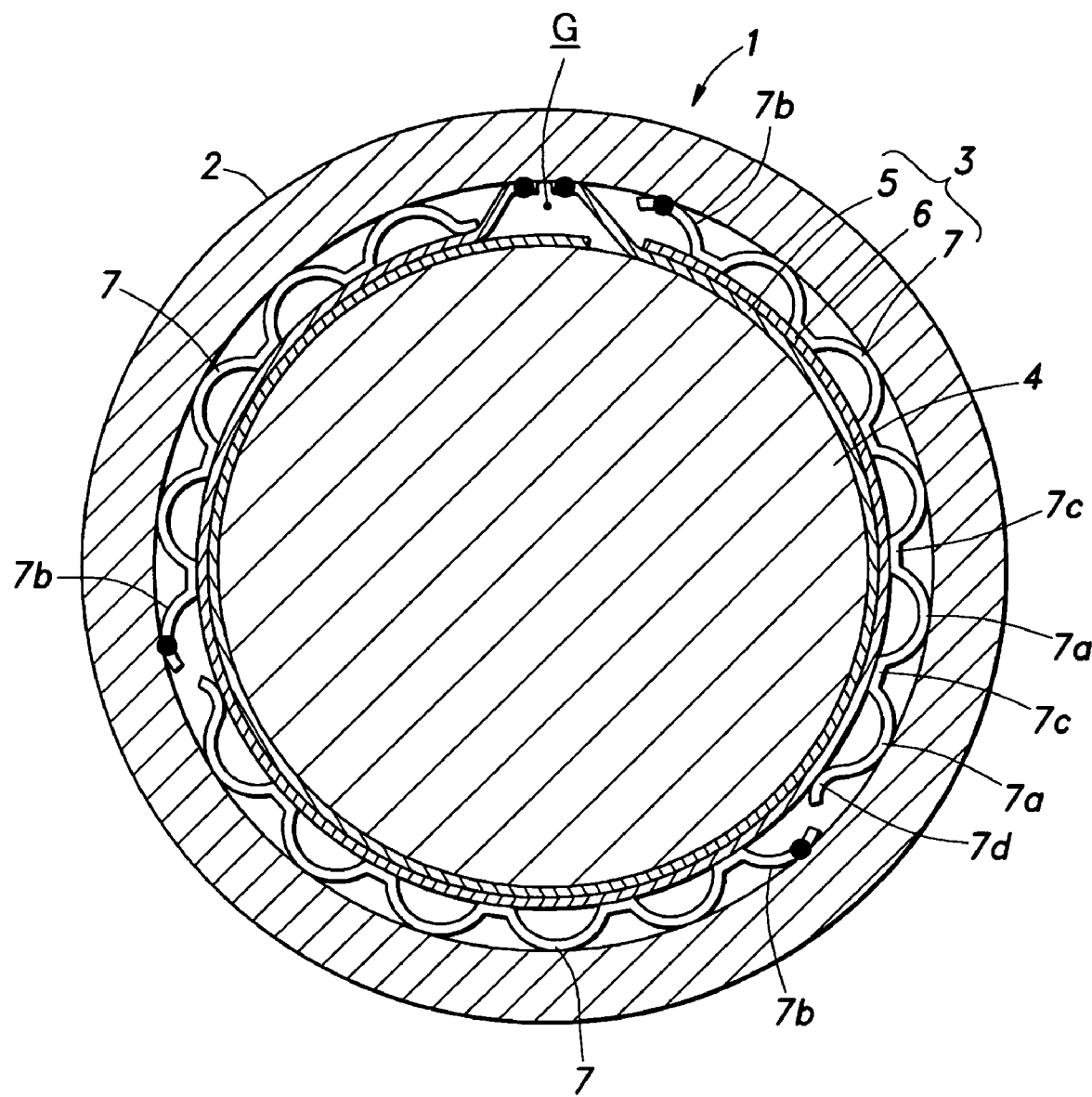
FIG. 1 is a cross-sectional view of a foil bearing manufactured by a manufacturing apparatus according to the present invention.
Figure 2:
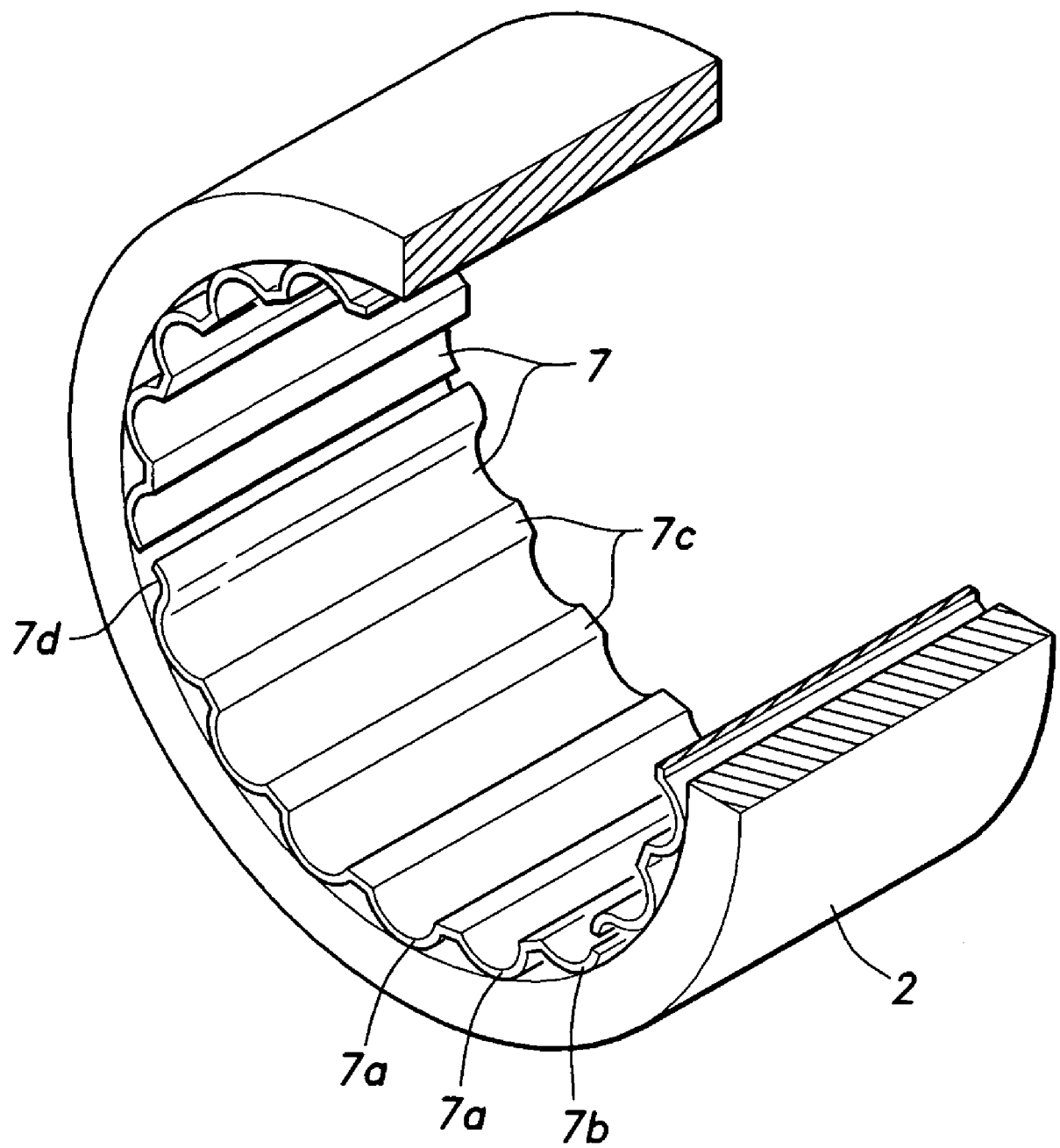
FIG. 2 is a partly cut-away perspective view showing an essential portion of the foil bearing.

FIG. 1 is a cross-sectional view of a foil bearing manufactured by a manufacturing apparatus according to the present invention, and FIG. 2 is a partly cut-away perspective view showing an essential portion of the foil bearing. In order to clearly show the relationship between various parts, the drawings may not be to actual scale. Also, welded parts in a foil assembly are schematically shown by black circles in FIG. 1.

This foil bearing 1 comprises a cylindrical stationary mount member 2 and a foil assembly 3 disposed on an inner circumferential surface of the stationary mount member 2.

A journal 4 having a substantially circular cross-section taken along a plane perpendicular to a rotation axis is inserted into the stationary mount member 2, and the foil assembly 3 is disposed in an annular gap G defined between the inner circumferential surface of the stationary mount member 2 and an outer circumferential surface of the journal 4, to rotatably support the journal 4. The foil assembly 3 comprises a top foil 5 disposed on a radially innermost side, a mid foil 6 disposed on an outer side of the top foil 5, and a plurality (three in this embodiment) of bump foils 7 disposed on an outer side of the mid foil 6. The foils 5-7 may be preferably made of a heat-resistant and creep-resistant material such as a nickel alloy.

The top foil 5 consists of a flat sheet material curved in a substantially cylindrical shape and one end thereof is welded to an upper part of the inner circumferential surface of the stationary mount member 2 while the other end thereof extends clockwise to surround the journal 4.

The mid foil 6 also consists of a flat sheet material curved in a substantially cylindrical shape as the top foil 5, and one end of the mid foil 6 is welded to a part of the inner circumferential surface of the stationary mount member adjacent to the one end of the top foil 5, while the other end of the same extends in a direction opposite to the direction in which the top foil 5 extends so as to overlap a substantially entire part of the outer circumferential surface of the top foil 5.

The bump foils 7 are foil members having wave-shaped portions for generating a centripetal force acting upon the journal 4. In the illustrated embodiment, each bump foil 7 consists of a wave-shaped plate having a plurality of arch-shaped portions 7a each protruding radially outward. The bump foils 7 are arranged in the circumferential direction along the inner surface of the stationary mount member 2, and one end portion 7b of each bump foil 7 is welded to the stationary mount member. The bump foils 7 are adapted such that a top of each arch-shaped potion 7a slidably contacts the inner circumferential surface of the stationary mount member 2, and a connecting portion 7c between adjacent arch-shaped portions 7a as well as a free end portion 7d slidably contact the outer circumferential surface of the mid foil 6, whereby deformation of the arch-shaped portions 7a can produce a centripetal resilient force acting upon the journal 4.

Next, an explanation is made to a structure of a manufacturing apparatus for a foil bearing according to the present invention.

Figure 3:
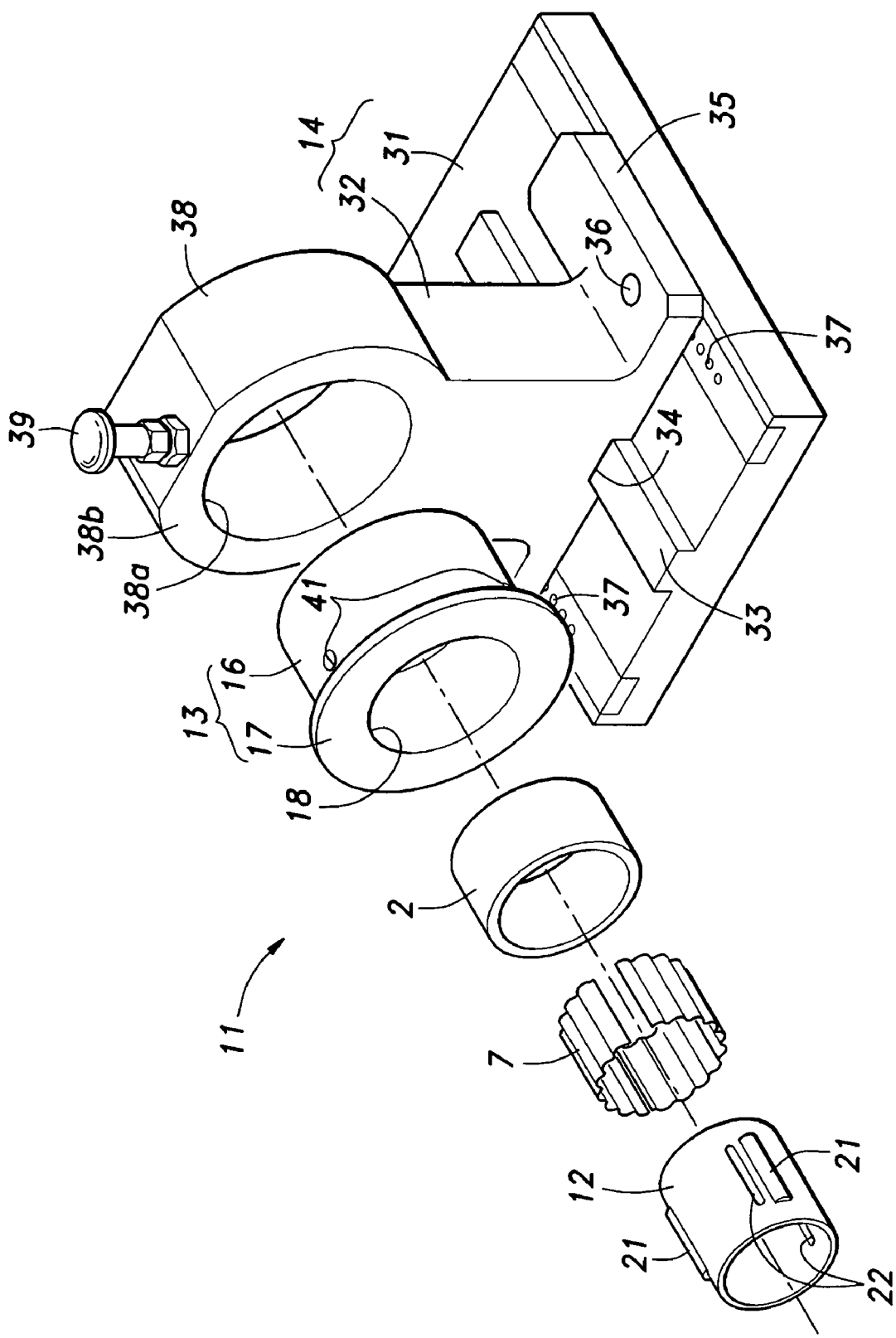
FIG. 3 is an exploded perspective view of the manufacturing apparatus according to the present invention.
Figure 4:
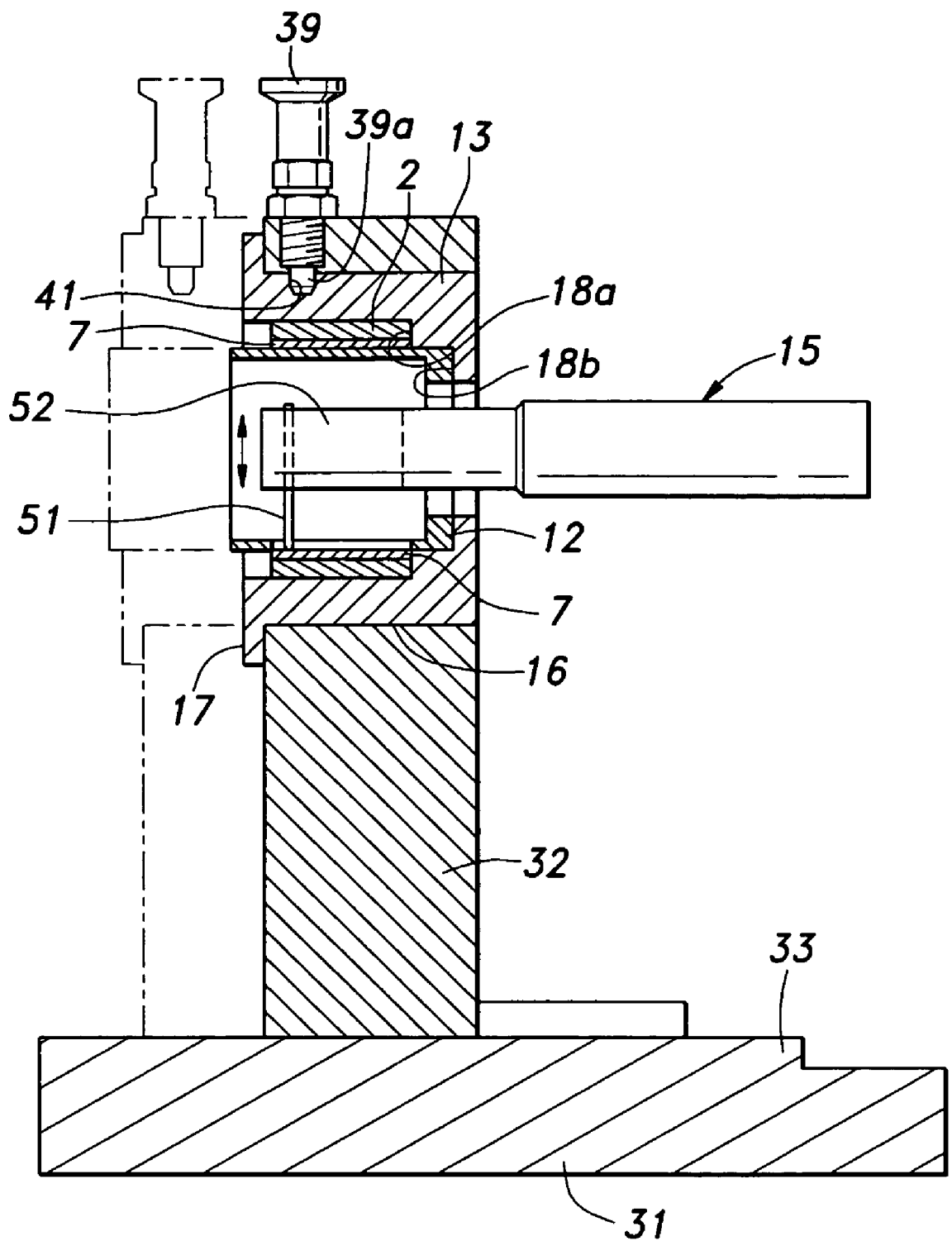
FIG. 4 is a longitudinal cross-sectional view of the manufacturing apparatus according to the present invention.
Figure 5:
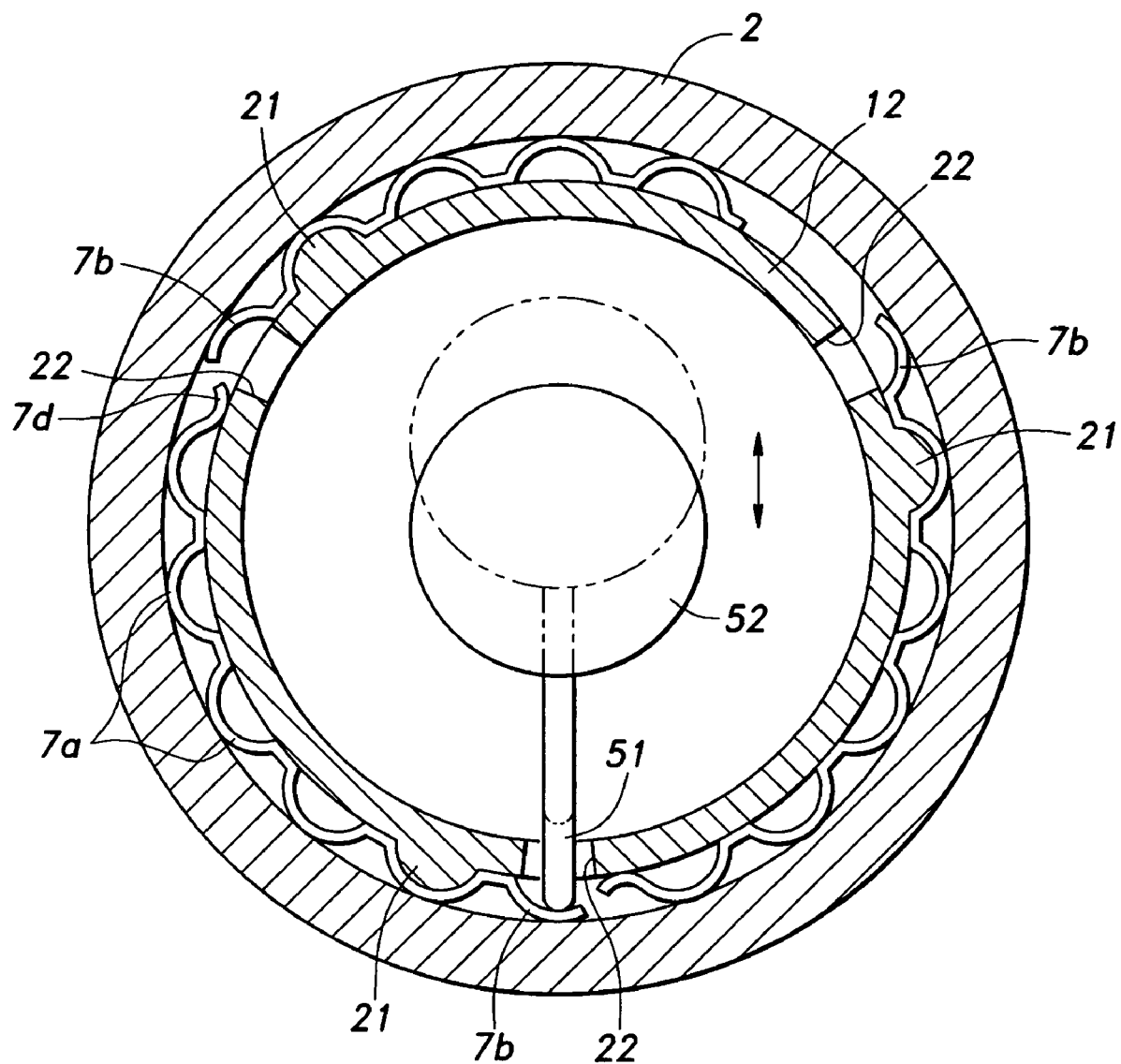
FIG. 5 is a cross-sectional view showing a state of positioning of bump foils before being welded to the stationary mount member.

FIG. 3 is an exploded perspective view of a manufacturing apparatus for a foil bearing according to the present invention, FIG. 4 is a longitudinal cross-sectional view of the manufacturing apparatus, and FIG. 5 is a cross-sectional view showing a state of positioning of bump foils at the time when they are welded to the stationary mount member by the manufacturing apparatus.

As shown in FIGS. 3 and 4, this manufacturing apparatus 11 comprises: a foil retaining jig (positioning member) 12 for positioning and retaining the bump foils 7 with respect to the stationary mount member 2; a holder member 13 for holding the stationary mount member 2 having the bump foils 7 retained by the foil retaining jig 12 inserted therein; a base 14 for supporting the holder member 13; and a welding device 15 for welding the bump foils 7 to the stationary mount member 2.

The foil retaining jig 12 consists of a substantially cylindrical tubular member adapted to be able to position the bump foils 7 between an outer circumferential surface thereof and the inner circumferential surface of the stationary mount member 2. The outer circumferential surface of a cylindrical wall of the foil retaining jig 12 is provided with a plurality of engagement portions 21 having a shape corresponding to at least a part the wave shape of the bump foils 7. Each engagement portion 21 consists of a projection extending out from the outer circumferential surface of the foil retaining jig 12 and its cross-section taken along a plane perpendicular to the axis has an arched profile corresponding to the arch-shaped portion 7a of the bump foil 7. The bump foils 7 can be positioned accurately with respect to the inner circumferential surface of the stationary mount member 2 or at desired circumferential positions by fitting appropriate one of the arch-shaped portions 7a of each bump foil 7 over the associated one of the engagement portions 21 to thereby engaging the bump foils 7 with the associated engagement portions 21, and inserting the foil retaining jig 12 into the stationary mount member 2.

It should be noted that various alterations and modifications can be made to the engagement portions 21 so long as the engagement portions 21 can serve to properly engage and position the bump foils 7. In the illustrated embodiment, one engagement portion 21 is provided for each bump foil 7, but it may be possible to provide a plurality of engagement portions 21 for each bump foil 7. Also, the shape of each engagement portion 21 is not limited to an arch so long it corresponds to a part of the wave shape of the bump foil 7. For example, the engagement portion 21 may have an outwardly open concave shape to fittingly receive the connecting portion 7c between adjacent arch-shaped portions 7a of the bump foil 7.

The foil retaining jig 12 is also provided in its cylindrical wall with a plurality (three in this embodiment) of slots 22 extending substantially in the axial direction. The positions of these slots 22 correspond to the positions of the end portions 7b of the bump foils 7 after being properly positioned by the engagement with the engagement portions 21. Further, the shape of each slot 22 (axial length and circumferential width) is designed so as to appropriately expose a part of the end portion 7b of the bump foil 7 to be welded so that this part can be accessed from inside of the foil retaining jig 12. In this way, it is possible to weld the end portion 7b of the bump foil 7 to the inner circumferential surface of the stationary mount member 2 without inadvertently welding an undesired part of the bump foil 7. It should be mentioned that the position and shape of the slots 22 is not limited to those shown in this embodiment, and various modifications and alterations may be made so long as the welded part of the bump foils 7 can be accessed from inside of the foil retaining jig 12 through the slots 22.

As shown in FIGS. 3 and 4, the holder member 13 has a cylindrical portion 16 and a flange portion 17 provided at one end of the cylindrical portion 16, so that an opening 18 is formed at its center. Defined inside the opening 18 are a larger annular recess 18a having a diameter corresponding to an outer diameter of the stationary mount member 2 so that the stationary mount member 2 can be fitted into the larger annular recess 18a and a smaller annular recess 18b having a diameter corresponding to an outer diameter of the foil retaining jig 12 so that a part of the foil retaining jig 12 can be fitted into the smaller annular recess 18b.

As shown in FIGS. 3 and 4, the base 14 comprises a base body 31 and a moveable support member 32 disposed on the base body 31 so as to be moveable in a prescribed direction. Specifically, a straight guide rail 33 is provided on an upper surface of the base body 31, and a groove 34 formed in a bottom surface of the moveable support member 32 slidably engages the guide rail 33 to constitute a movement mechanism that allows the moveable support member 32 to move along the rail 33 on the base body 31. The moveable support member 32 also comprises left and right legs 35 to which a ball plunger 36 is provided so that positioning of the moveable support member can be achieved by engaging the ball plunger 36 with one of a series of engagement halls 37 formed on the upper surface of the base body 31. Further, the moveable support member 32 comprises a supporting portion 38 formed with an opening 38a having a diameter corresponding to an outer diameter of the cylindrical portion 16 of the holder member 13. The holder member 13 can be supported by the supporting portion 38 with the cylindrical portion 16 of the holder member 13 being inserted into the opening 38a and the flange portion 17 of the holder member 13 being in contact with a front surface 38b of the supporting portion 38.

In the base 14, an outer circumferential surface of the cylindrical portion 16 of the holder member 13 is received in the opening 38a slidably rotatably, to whereby constitute a rotation mechanism for allowing the holder member 13 to rotate relative to the supporting portion 38 of the movable support member 32. On top of the supporting portion 38, an index plunger 39 is attached, and an engagement projection 39a provided at its end extends through a top wall of the supporting portion 38 into the opening 38a so as to be engageable with a plurality of engagement halls 41, which are formed on the outer circumferential surface of the cylindrical portion 16 of the holder member 13 so as to be spaced apart from each other in the circumferential direction. Thus, the holder member 13 can be indexed to discrete rotational positions which are determined by engagement between the index plunger 39 and the engagement holes 41. It should be noted that the number of the engagement holes 41 is preferably equal to the number of the bump foils 7.

The welding device 15 serves to spot-weld the bump foils 7 to the inner circumferential surface of the stationary mount member 2, and has a head portion 52 for supporting a welding electrode 51, as shown in FIG. 4. The head portion 52 is placed inside the foil retaining jig 12 when performing welding so that the head portion 52 (or electrode 51) can access the bump foils 7 via the slots 22 from inside the foil retaining jig 12 to weld the bump foils 7 to the inner surface of the stationary mount member 2. The head portion 52 is supported by an arm not shown in the drawings so as to be moveable in an up-down direction (i.e., in a radial direction of the stationary mount member 2) whereby an end of the electrode 51 can be brought into/out of contact with a welded part of each bump foil 7.

It should be noted that when performing the welding, it is possible to select the welded member (any of the bump foils 7) as well as change the welded part of each bump foil 7 by rotating the holder member 13 and moving the moveable support member 32 on the base body 31 while keeping the head portion 52 of the welding device 15 substantially unmoved (except for the up-down movements for bringing the electrode 51 into/out of contact with the welded part). This can contribute to achieving more accurate and reliable welding.

Next, an explanation is made to a method for manufacturing a foil bearing by using the above-constructed manufacturing device 11.

First, an appropriate arch-shaped portion 7a of each bump foil 7 is fitted over the associated engagement portion 21 of the foil retaining jig 12, and then the foil retaining jig 12 is inserted into the stationary mount member 2 to thereby place the bump foils 7 between the outer circumferential surface of the foil retaining jig 12 and the inner circumferential surface of the stationary mount member 2. Subsequently, the stationary mount member 2 is fitted into the opening 18 of the holder member 13, which in turn is inserted into the opening 38a of the base 14. In this state, as shown in FIG. 5, the end portion 7b (welded part) of each bump foil 7 is exposed by the associated slot 22 to the inside of the foil retaining jig 12 so that the electrode 51 of the welding device 15 can access the end portion 7b.

The welding of each bump foil 7 is performed in a state that the head portion 52 of the welding device 15 has lowered from a stand-by position to an operating position (shown by phantom lines and solid lines, respectively, in FIG. 5) so that the electrode 51 is in contact with the bump foil 7.

Figure 6:
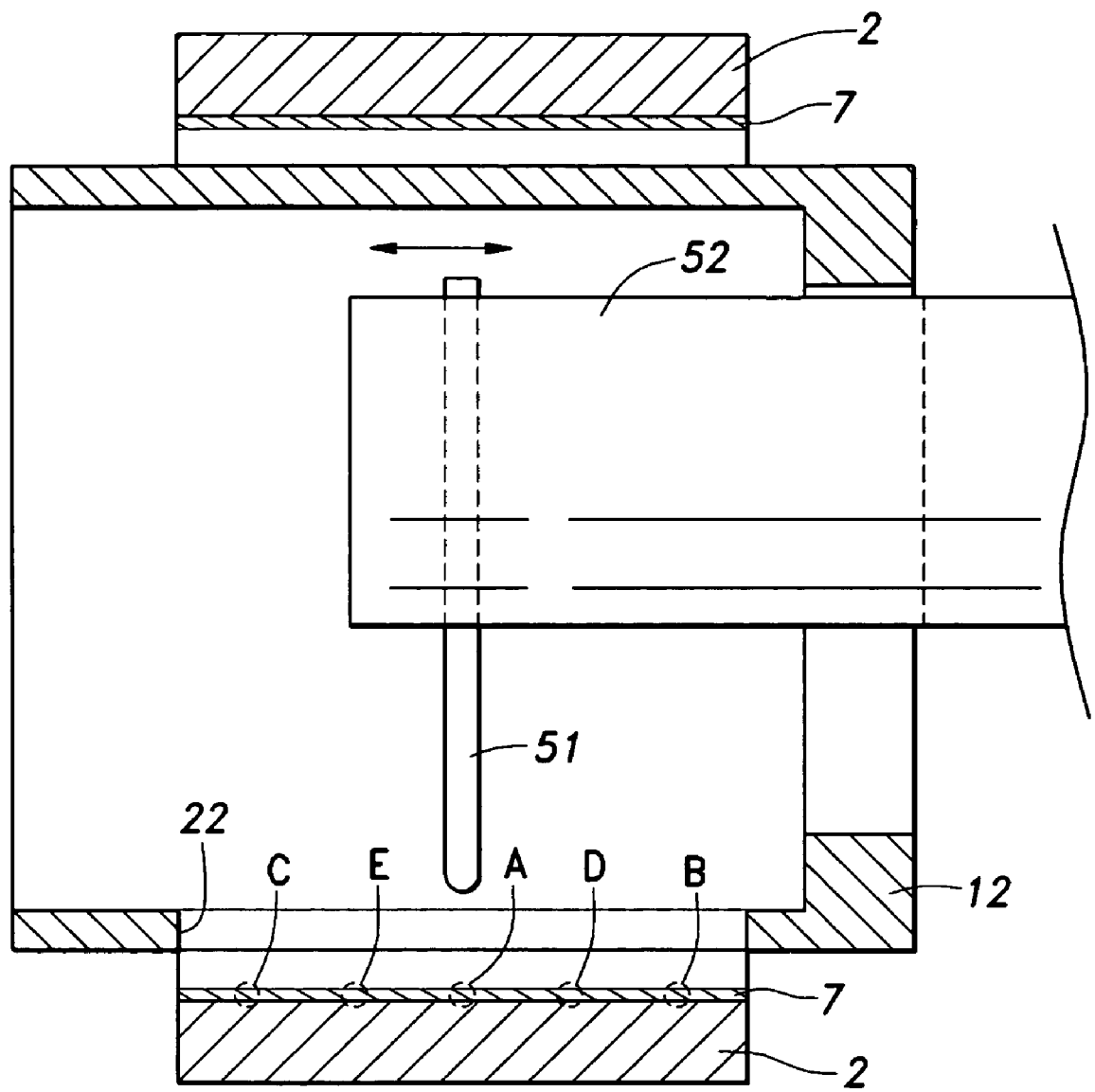
FIG. 6 is a view for explaining the steps for welding the bump foils.

When a weld, which typically is a point weld, is formed at a position where the electrode 51 contacts the bump foil 7, the head portion 52 is lifted to the stand-by position, and then, as shown by phantom lines in FIG. 4, the moveable support member 32 is moved a prescribed distance on the base body 31 while the head portion 52 remain unmoved, to thereby change the welded position. In the illustrated embodiment, the end portion 7b of one bump foil 7 is spot-welded at five positions spaced apart in the axial direction. Specifically, in FIG. 6, the five positions correspond to a middle part A, front end part B, rear end part C, front middle part D, and rear middle part E, and these parts are welded sequentially in this order. In this way, it is possible to minimize deformation resulting from the welding and thus allow the bump foil 7 to be secured to the stationary mount member with high precision.

Once the welding of the end portion 7b of one bump foil 7 (i.e., welding of five parts A-E in FIG. 6 in this embodiment) is completed, the holder member 13 is rotated and indexed by the index plunger 39 to move the end portion 7b of another bump foil 7 to a location where the welding can be performed (i.e., a location where the end portion 7b faces the electrode 51 through the slot 22, as shown in FIG. 5). Then, the welding is performed in the same fashion as above.

It should be noted here that the foil retaining jig 12 and the holder member 13 are aligned beforehand in the circumferential direction so that a selected one of the slots 22 of the foil retaining member 12 (or the end portion 7b of the bump foil 7 exposed thereby) can be positioned to face the electrode 51 of the welding device 15 by indexing the holder member 13 to one of the predetermined rotational positions determined by the engagement halls 41.

After the welding has been completed for each bump foil 7, the foil retaining jig 12 is removed from the stationary mount member 2. Then, the mid foil 6 and top foil 5 are welded to the stationary mount member 2 and the manufacturing of foil bearing 1 is completed. The welding of mid foil 6 and top foil 5 to the stationary mount member 2 is no different from the conventional embodiment, and thus detailed explanation thereof is omitted.

As described above, the manufacturing apparatus for a foil bearing according to the present invention allows a plurality of foil members each having a wave-shaped portion to be positioned easily and precisely at desired circumferential positions. Also, the manufacturing apparatus can allow the positioned foil members to be easily welded to an inner surface of a stationary mount member. Therefore, the manufacturing apparatus of the present invention is quite useful in manufacturing a foil bearing having a stationary mount member surrounding an outer circumferential surface of a journal via an annular gap and a foil assembly disposed inside the stationary mount member to support the journal.

Although the present invention has been described in terms of preferred embodiments thereof, it is obvious to a person skilled in the art that various alterations and modifications are possible without departing from the scope of the present invention which is set forth in the appended claims. For example, the number of the slots 41 may be larger than the number of the bump foils 7 or the holder member 13 may be adapted to be positioned at any desired rotational position so that the welded part (position) of each bump foil 7 may be changed in the circumferential direction.

The disclosure of the original Japanese patent application (Japanese Patent Application No. 2007-041557 filed on Feb. 22, 2007) on which the Paris Convention priority claim is made for the present application is hereby incorporated by reference in its entirety.

The invention claimed is:

1. A manufacturing apparatus for a foil bearing having a stationary mount member surrounding an outer circumferential surface of a journal via an annular gap and a plurality of foil members each having a wave-shaped portion, the foil members being circumferentially arranged on an inner circumferential surface of the stationary mount member, the apparatus comprising:

a tubular positioning member having a substantially cylindrical wall provided on its outer circumferential surface with engagement portions each having a shape corresponding to at least part of the wave-shaped portion of associated one of the foil members such that positioning of the foil members can be achieved by engaging the wave-shaped portion of each foil member to the associated engagement portion of the positioning member and inserting the positioning member into an inside of the stationary mount member; and a welding device for welding the foil members to the inner circumferential surface of the stationary mount member, wherein the positioning member is formed with openings in the substantially circumferential wall thereof to allow the welding device to access the foil members from inside the positioning member through the openings.

2. The manufacturing apparatus according to claim 1, further comprising a base for supporting the stationary mount member, wherein the base is provided with a movement mechanism for allowing movement of the stationary mount member in an axial direction.

3. The manufacturing apparatus according to claim 1, further comprising a base for supporting the stationary mount member, wherein the base is provided with a rotation mechanism for allowing rotation of the stationary mount member around its axis.

4. The manufacturing apparatus according to claim 1, where in the openings formed in the substantially cylindrical wall of the positioning member each consist of a slot extending in the axial direction so as to expose only a welded part of associated one of the foil members.

* * * * *